June 9, 1931.   C. G. JOHNSON   1,808,816
SCREW THREAD TESTING DEVICE
Filed June 30, 1924   2 Sheets-Sheet 1

Inventor
Charles G. Johnson
By Dewey, Strong, Townsend & Loftus
Attorneys

June 9, 1931.  C. G. JOHNSON  1,808,816
SCREW THREAD TESTING DEVICE
Filed June 30, 1924   2 Sheets-Sheet 2
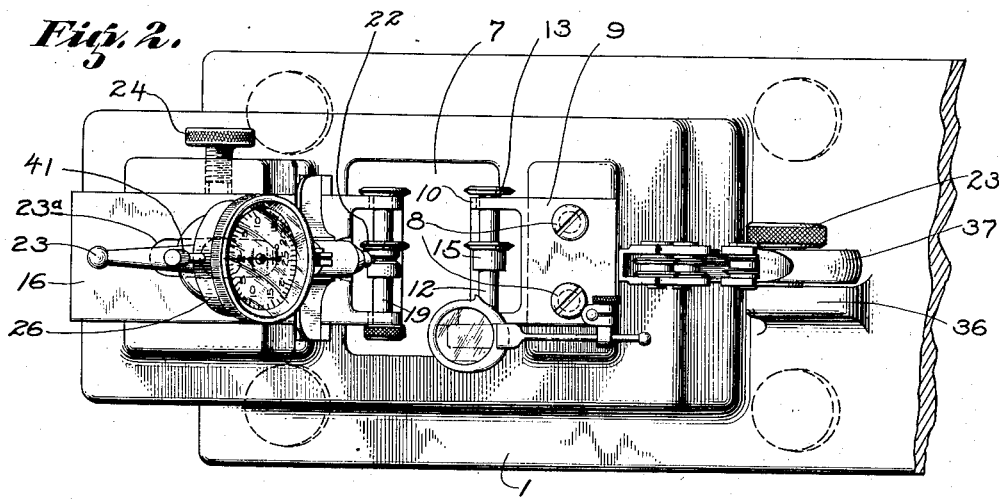
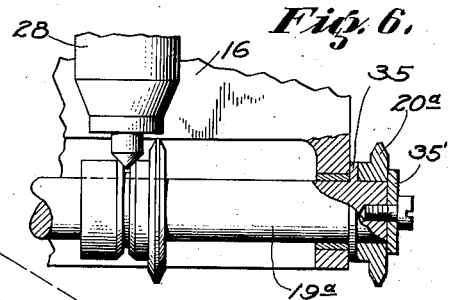
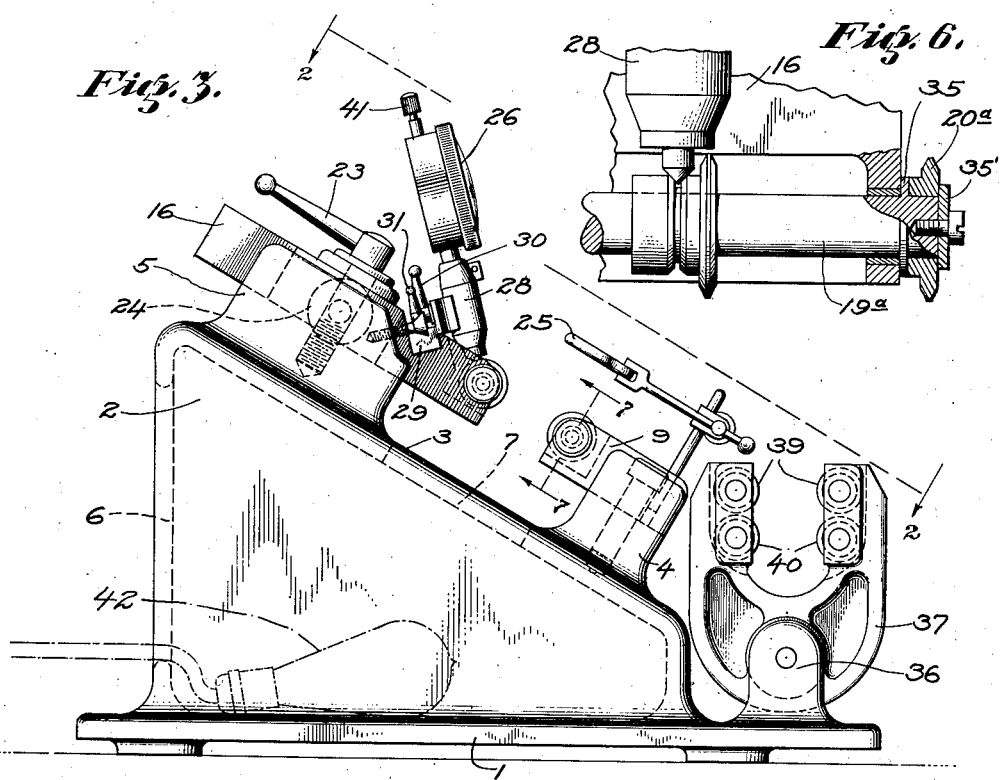
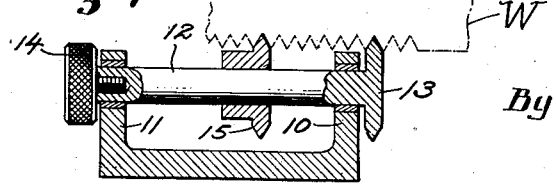
Inventor
Charles G. Johnson
By Davey, Strong, Townsend & Loftus
Attorneys Patented June 9, 1931

1,808,816

UNITED STATES PATENT OFFICE

CHARLES G. JOHNSON, OF HARTFORD, CONNECTICUT, ASSIGNOR TO PRATT & WHITNEY COMPANY, OF HARTFORD, CONNECTICUT, A CORPORATION OF NEW JERSEY

SCREW THREAD TESTING DEVICE

Application filed June 30, 1924. Serial No. 723,122.

This invention relates to screw thread testing devices, and particularly to an improved device for testing the lead of screw threads. The primary object of my invention is to provide an improved device for performing this function with greater accuracy and facility than has been done heretofore, this device embodying an improved screw supporting cradle having one or more co-axial supporting rollers, the peripheries of which are shaped to engage between the threads of the screw and thereby readily and accurately locate the screw thread for gauging its lead or pitch, cooperating means being provided in opposed relation to the rollers in a manner cooperating therewith to support the screw.

In the accompanying drawings I have illustrated the above mentioned cradle as having a pair of co-axial annular gauging elements for engaging one side of a screw to be tested and a similar pair of elements for engaging the opposite side of the screw, the function of one pair being to test the lead and the function of the other being to test the form accuracy of the thread. Another object of my invention is therefore to provide, preferably in combination with the lead testing device above mentioned, a screw thread comparator for accurately observing and comparing the form of screw threads to determine their accuracy, my improved lead tester and comparator being adapted to cooperate to simultaneously test the lead of screw threads and the form accuracy thereof with great precision.

More specifically therefore, it is an object of my invention to provide a device of the type last stated, in which the screw thread engaging means are annular elements certain of which have a periphery shaped to the form of the thread being tested and other of which are shaped to accurately engage the thread for lead testing, certain of such elements preferably being freely rotatable.

Another object of my invention is to provide an improved screw thread lead tester and comparator comprising a hollow support with an inclined top wall, one end wall of the support having an opening therein to permit the entrance of light, and the top wall having an opening therethrough beneath the thread engaging members of the device. The device as thus constructed is very convenient for the operator, and the opening through the top wall permits easy observation of the engagement of the thread engaging means with the threads being tested.

Another object of my invention is to provide, in combination with the screw thread lead tester and comparator mechanism, means for supporting a snap thread gage directly adjacent thereto and on the base thereof, whereby the diameter of the threaded element being tested can also be measured on the same device.

With the above and other objects in view my invention consists in the features of construction and operation set forth in the following specification and illustrated in the accompanying drawings. In such drawings annexed hereto and forming a part of this specification, I have shown the specific embodiment of my invention which I now deem preferable, but it should be understood that the drawings are not to be construed as defining or limiting the scope of the invention, the claims appended to this specification being relied upon for that purpose.

Referring to the figures of the drawings:

Fig. 2 is a plan view taken on line 2—2 of Fig. 3.

Fig. 3 is a side elevation.

Fig. 6 is a fragmentary view similar to Fig. 4, but showing certain modified details.

Fig. 7 is a sectional view taken on line 7—7 of Fig. 3.

Figure 1:
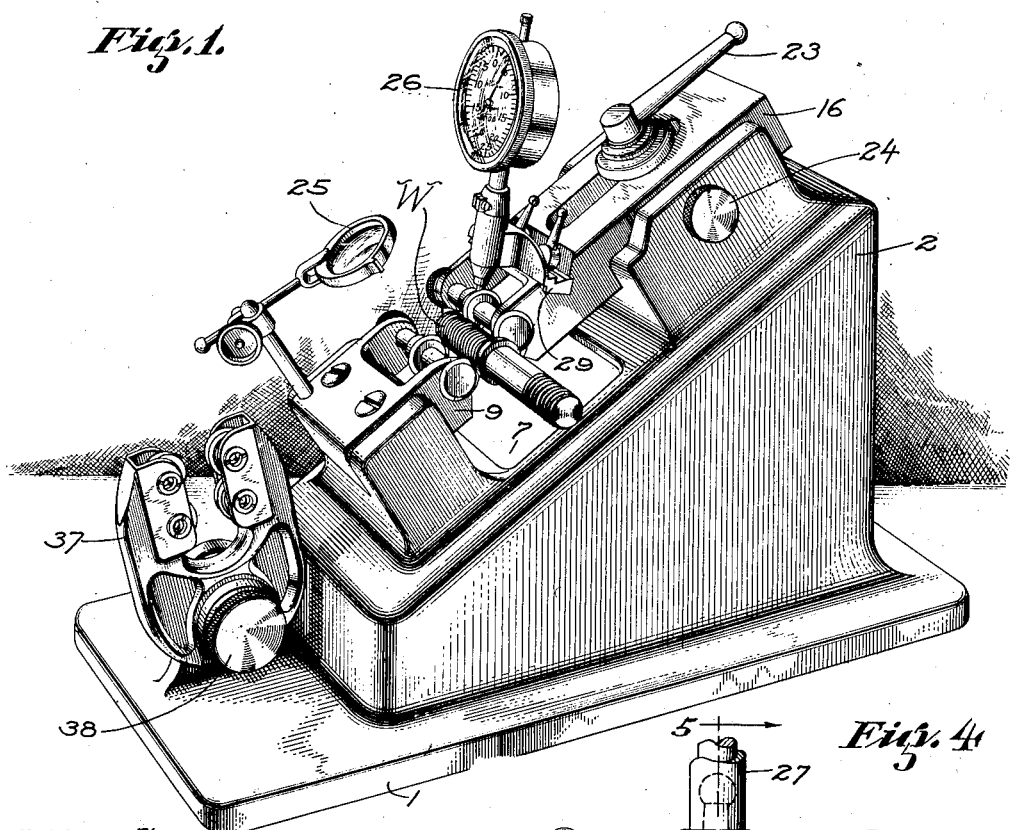
Fig. 1 is a perspective view of my improved screw thread testing device.

I am aware that various mechanisms have been devised for testing the lead of screw threads and the form accuracy of such threads. The principles of operation of such devices are usually very similar, though the mechanisms may vary rather widely. However, in all of such devices, as far as I am aware, the thread engaging members or anvils comprise pointers of various shapes, V-shaped elements, etc. The construction which I employ embodies a cradle formed by a plurality of annular thread engaging elements or anvils, all of which are free to rotate, except possibly one. As illustrated in the drawings, this one element may or may not be rotatably mounted, as may seem desirable. The peripheries of these elements or rollers are formed to the shape of the threads being tested, and ordinarily engage such threads only on the angle faces thereof. In the drawings I have illustrated two diametrically opposed pairs of these rollers, and the same are adapted to receive the screw threaded element to be tested therebetween. Other means hereinafter described, cooperate with the rollers to perform the thread testing functions. The freely rotatable rollers provide rolling contacts for the thread testing operations and permit a fuller and more accurate engagement with the side angles of the threads. These and other features of advantage will be hereinafter more fully described.

Referring more specifically to the drawings by reference characters, 1 indicates the base of my improved thread testing device having a hollow body portion 2. The top wall 3 is inclined forwardly and provided with two abutments 4 and 5 thereon. A large opening 6 is formed in the higher end wall of the body 2 and a smaller opening 7 is formed in the top wall between the two abutments. The large opening 6 permits light to enter the hollow body 2 beneath the thread engaging elements which are suspended on the abutments 4 and 5 over the opening 7.

Supported on the abutment 4 and secured thereto by means of screws 8 is a block 9. The upper end of the block is bifurcated to form a pair of arms 10 and 11 extending over the opening 7. A shaft 12, mounted for free rotation in the ends of these arms has an annular thread engaging element or anvil 13 on one end thereof and a knurled securing screw 14 at its other end. A second and like element 15 is mounted for free rotation on the shaft between the arms. The peripheries of these elements are accurately formed to the shape of the correct groove in the screw thread to be tested and the upper portions of such elements extend over the opening 7 as illustrated in Fig. 2.

Figures 4, 5:
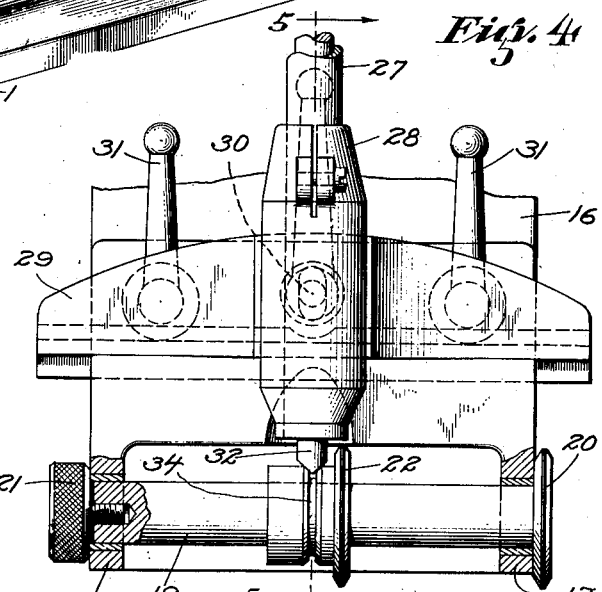
Fig. 4 is an enlarged front elevation of the movable gaging roller and its co-operating mechanism.
Fig. 5 is a sectional view thereof taken on line 5—5 of Fig. 4.

Mounted in the abutment 5 for adjustment toward and from the abutment 4 is a slide 16. The lower end of this slide is bifurcated to form a pair of arms 17 and 18 opposite the arms 10 and 11 of the block 9. A shaft 19 mounted in the ends of these arms has an annular thread engaging element or anvil 20 on one end thereof and a knurled securing screw 21 at its other end. As illustrated in Fig. 4, the screw 21 is adapted to draw the element 20 tightly against the arm 17 and thus hold the element and shaft 19 against rotation. A second element 22 in the form of a roller is mounted for free rotation on the shaft between the arms. The peripheries of these elements are accurately formed to the shape of the correct groove in the screw thread to be tested, the crests of such peripheries, however, being truncated and slightly rounded so that the bearing will be wholly on the angle of the thread with clearance at the root of the thread.

The slide 16 is adjustable toward and from the block 9 and can be secured in adjusted position by means of a binding lever 23 which extends through a slot 23a in the slide and threads into the abutment 5. The block is furthermore held against any looseness by means of a screw 24 threaded into the abutment 5 and bearing against the slide. Tightening of the screw 24 presses the slide laterally into tight engagement with the opposite wall of the slideway in the abutment and tightening of the binding lever 23 holds the slide downward firmly on the abutment. The slide is therefore held secure against any looseness or vibration.

The rollers or anvils 13 and 15 may be termed the comparator rollers, since the engagement of one or both such rollers with the screw threads is used to determine the form accuracy of such threads. For the purpose of aiding the operator to closely observe the engagement of these rollers with the screw threads, a magnifying glass 25 is preferably suspended from the block 9 above these rollers, the glass ordinarily being used with the roller 15 which is sufficient to test the screw form. The rollers 20 and 22 may be termed the lead testing rollers, since such rollers in combination with an indicating mechanism now to be described are used to determine the lead accuracy or inaccuracy of the screw threads. While as heretofore stated and as illustrated in the drawings, I preferably employ both sets of rollers 13—15 and 20—22 to make a lead and form testing combination, my invention is not to be considered as so limited since obviously either of these sets of rollers can be employed without the other, it only being necessary to provide some form of cooperating screw support opposite the set of rollers being used.

As illustrated in Figs. 2 and 4, the thread engaging roller 20 is secured against both rotation and axial movement. The roller 22, however, is free to both rotate and move axially. In operation, the axial position of the movable roller 22, relative to the fixed roller 20, determines the lead accuracy or inaccuracy of the screw thread being tested. A dial indicator 26 cooperates with this movable roller for measuring this axial position in the following manner.

The supporting stem 27 (Fig. 5) of the indicator 26 is mounted in a barrel 28 secured to a cross slide 29 in the slide 16 by means of a binding lever 30. This binding lever extends through a vertical slot in the cross slide and threads into the barrel. The cross slide is adjustable transversely of the slide 16 and can be secured by means of a pair of binding levers 31. Mounted in the lower end of the barrel is a pin 32 adapted to cooperate with the plunger 33 of the indicator and the movable roller 22 to operate the indicator upon axial movement of the roller. The pin 32 at its upper end abuts against the lower end of the plunger 33 and at its lower end has a V-shaped loose engagement with the hub of the roller. For convenience and simplicity, I form an annular groove 34 about the hub of the roller and bevel the end of the pin to a wedge shape to fit thereinto. It is obvious, however, that this arrangement may be reversed if desired, and that such modification is within the scope of my invention. Obviously, axial movement of the roller in either direction will force the pin outwardly and operate the indicator.

Certain details of my device are shown slightly modified in Fig. 6 of the drawings. It will be understood that the wedge shaped end of the pin 32 can be bevelled off as shown in Figs. 4 and 5, conical as shown in Fig. 6, or any shape to serve the function intended. Also while the anvil or roller 20 in Figs. 1, 2 and 3 is shown as secured against rotation, such roller can be rotatably mounted if desired or considerably modified from the particular shape illustrated as, for example, to the shape of a segment of such roller. This roller is shown as rotatably mounted in Fig. 6. The clearance of the roller 20a between the flange 35 and disc 35' on the end of the shaft 19a is sufficient to permit rotation of the roller, but insufficient to permit any appreciable axial movement of the roller on the shaft.

The mechanism as thus far described is adapted to measure the lead and form accuracy of screw threads. It is also usually desired to determine the accuracy of the threaded diameter of the threaded elements being tested. My invention therefore contemplates other and cooperating means for also performing this function. This means comprises an upwardly extending lug 36 at one end of the base 1 for receiving and supporting a snap thread gage 37. The gage is secured in the upright position illustrated by means of a knurled screw 38 extending through a hole in the gage body and threaded into the lug. Maximum or "go" thread gaging rollers 39 and minimum or "not go" thread gaging rollers 40 are supported in opposed relation in the two arms of the gage to determine the diameter accuracy of the threaded element within the desired limits in the usual manner. These rollers are freely rotatable and the periphery of each is provided with annular thread engaging means. This snap gage comprises the subject matter of my Patent No. 1,660,-335 granted February 28, 1928, wherein the gage is more fully described.

The operation of my device is as follows:

A master thread gage is first used to accurately set the indicator 26 to zero. The threads of this master are placed in close and accurate contact with the anvils or rollers 20 and 22. The adjusting knob 41 of the indicator is then rotated until the indicator points to zero. The length of the lead test can be varied by adjusting the cross slide 29 as desired. The slide 16 is then adjusted toward the block 9 to a position slightly closer than would permit the passage therethrough of a screw of the minimum diameter. The knurled screw 24 is then tightened and thereafter the binding lever 23. When it is desired to change the roller 22, the barrel 28 and pin 32 of the indicator can be slightly raised by loosening the screw 30 which extends through an elongated vertical slot in the cross slide.

The testing of work is accomplished by laying the threaded piece W to be tested in the cradle formed by the annular anvils or rollers 13, 15, 20 and 22 which support the work entirely by engaging the angle sides of the threads thereof. In small sizes of work it is necessary to add a slight pressure of the finger to the work so that it will overcome the resistance offered by the spring in the indicator and properly seat itself. This spring returns the indicator roller 22 to its original position after the work has been removed from the cradle. The indicator having been set by a threaded master as above described, it will be clear that any inaccuracy in the lead of the thread being tested will cause the roller 22 to be moved axially in one direction or the other relative to the anvil 20, and the amount of such movement will be accurately recorded by the indicator. Any inaccuracy of lead or pitch in such thread is therefore accurately and automatically disclosed by the indicator. It should be particularly noted that the crests of these rollers are truncated and slightly rounded so that the bearing will be wholly on the angle or side of the thread, thus giving an accurate contact for testing the lead of such thread.

The lower rollers 13 and 15 are for comparator purposes and the lens 25 is to magnify the contact between the rollers and the threads. A separate pair of rollers is usually used for each thread pitch, owing to the variations in depth, crest, etc., due to pitch. The peripheries of these rollers are formed to the exact shape of the grooves in the threads to be tested, and the operator can, by observing through the lens 25, readily determine any inaccuracy in the form of the threads. The chamber within the body 2 is preferably white enameled to assist the operator in exposing any inaccuracy in the form of the thread as he views the same through the opening 7. Ordinarily a sufficient natural light for observation purposes will enter the chamber through the opening 8. An electric light bulb 42 may, however, be placed within the chamber if desired.

The thread engaging portions of the rollers 13, 15, 20 and 22 for the lead and form testing are in general the same as those of the diameter testing rollers 39 and 40 of the snap gage. All of such rollers may be freely rotatable to permit easy thread engagement. Furthermore, such rollers are more accurate than the usual thread testing devices now in use, since these rollers provide for a "line contact" with the angle sides of the threads, as distinguished from the "point contacts" heretofore employed. It may also be stated that the supporting of the threaded element by engaging only the angle sides of the thread thereof (in the cradle formed by the rollers 13, 15, 20 and 22) provides the greatest accuracy, and because it functions without any interference with the helix angle of the thread and gives a "line contact", an annular element is the most practical means for engaging screw threads. These various features of advantage have been incorporated in my invention herein disclosed and claimed.

Having thus described my invention, what I claim and desire to secure by Letters Patent is:

1. In a screw thread testing device, the combination of a base, a normally fixed screw-engaging member thereon, a thread-engaging anvil member cooperating with the fixed member to guage the lead of a thread and provided with a recess therein, means mounting the anvil member for movement toward and from the said fixed member in a direction parallel to the axis of the threaded member being tested, an indicator, and a plunger cooperating with the indicator so as to register on the indicator its longitudinal movements towards the indicator, the free end of the plunger being beveled and extending into the said recess to have line engagement therewith on both sides of he plunger end whereby movement of the movable member toward or from the fixed member will force the plunger outwardly of the recess and operate the indicator an amount corresponding to the said movement.

2. In a screw thread testing device, the combination of a base, a normally fixed thread-engaging anvil thereon, a second thread-engaging anvil cooperating with the fixed anvil to gauge the lead of a thread and provided with a recess therein, means mounting the second anvil for movement toward and from the fixed anvil in a direction parallel to the axis of the threaded member being tested, an indicator, and an elongated longitudinally movable member having a wedge-shaped end extending into the said recess and cooperating with the indicator whereby movement of the movable anvil in a direction parallel to the axis of the screw being tested will force the wedge-shaped member outwardly of the recess and operate the indicator an amount corresponding to the said anvil movement.

3. In a screw thread testing device, the combination of a base, a normally fixed thread-engaging anvil thereon, a roller having an annular thread-engaging anvil cooperating with the fixed anvil and provided with a circumferential groove therearound, means mounting the roller for movement axially, an indicator, and means extending into the said groove and cooperating with the indicator whereby movement of the roller axially will force the last said means outwardly from said groove and operate the indicator an amount corresponding to such axial movement.

4. In a screw thread testing device the combination of a base, a normally fixed thread engaging anvil thereon, a roller having an annular thread-engaging anvil cooperating with the fixed anvil to gauge the lead of a thread, means mounting the roller for movement axially, an indicator, means cooperating with the indicator and engaging the roller whereby movement of the roller axially in either direction will operate the indicator a corresponding amount, means located opposite the said anvils and cooperating therewith to support a threaded piece to be gaged, and means providing a relative approaching and separating adjustment between the last named means and the anvils.

5. In a screw thread testing device, the combination of a base, a shaft mounted thereon, an annular thread-engaging anvil on the shaft and normally immovable axially thereof, a roller mounted for axial movement on the shaft and having an annular thread-engaging anvil cooperating with the first mentioned anvil to gauge the lead of a thread, the said roller having a circumferential groove formed therearound, an indicator, and means engaging in the said groove and cooperating with the indicator whereby movement of the roller axially will force the said means outwardly from said groove and operate the indicator a corresponding amount.

6. In a screw thread testing device, the combination of a base, screw thread engaging means thereon adapted to engage one side of a threaded element to be tested, a pair of screw thread engaging anvils on the base opposite the said means and co-operating therewith to support a threaded piece to be gaged, an indicator, one of the anvils being normally fixed against movement in a direction parallel to the axis of the screw threaded element, the other anvil being a freely rotatable roller having an annular thread engaging periphery, means mounting the roller for straight axial movement, means cooperating with the indicator and roller for proportionately operating the former upon movement of the latter in said direction, and means providing a relative approaching and separating adjustment between the first named means and the anvils.

7. In a screw thread testing device, the combination of a base, screw thread engaging means thereon adapted to engage one side of a threaded element to be tested, a pair of co-axial annular thread-engaging members on the base opposite the said means and cooperating therewith to support a threaded piece to be gaged, an indicator, one of the members being normally fixed against axial movement, means mounting the other member for movement axially, and means cooperating with the indicator and the movable member for proportionately operating the former upon axial movement of the latter.

8. In a screw thread testing device, the combination of a base, screw thread engaging means thereon adapted to engage one side of a threaded element to be tested, a shaft supported on the base, a pair of annular thread-engaging elements on the shaft opposite the said means and cooperating therewith to support a threaded piece to be gaged, an indicator, one of the said elements being normally fixed against axial movement and the other element being movable axially on the shaft, and means cooperating with the indicator and movable element for registering on the former the extent of axial movement of the latter.

9. In a screw thread testing device, the combination of a base, screw thread engaging means thereon adapted to engage one side of a threaded element to be tested, a pair of screw thread engaging anvils on the base opposite the said means and co-operating therewith to support a threaded piece to be gaged, one of the anvils being normally fixed against movement in a direction parallel to the axis of the screw threaded element, means mounting the other anvil for movement in such direction, a cross slide supported by the base for adjustment in the last named direction, an indicator on the cross slide, and means between the indicator and movable anvil for operating the former upon said axial movement of the latter.

10. In a screw thread testing device, the combination of a base, screw thread engaging means thereon adapted to engage one side of a threaded element to be tested, a slide adjustable on the base toward and from the said means, a pair of screw thread engaging anvils on the slide adapted to engage the screw threaded element at the side opposite that engaged by the said means, an indicator on the slide, one of the anvils being normally fixed against movement in a direction parallel to the axis of the screw-threaded element, means mounting the other anvil for movement in such direction, and means cooperating with the indicator and movable anvil for operating the former upon axial movement of the latter.

11. In a screw thread testing device, the combination of a base, screw thread engaging means thereon adapted to engage one side of a threaded element to be tested, a slide adjustable on the base toward and from the said means, a pair of screw thread engaging anvils on the slide adapted to engage the screw threaded element at the side opposite that engaged by the said means, one of the anvils being normally fixed against movement in a direction parallel to the axis of the screw threaded element, means mounting the other anvil for movement in such direction, a cross slide supported by the first-named slide and adjustable in the last said direction, an indicator on the cross slide, and means between the indicator and movable anvil for operating the former upon axial movement of the latter.

12. In a screw thread testing device, the combination of a base, a freely rotatable roller thereon having an annular thread-engaging periphery adapted to engage one side of a threaded element to be tested, the said periphery being shaped to fit the groove of the thread being tested whereby the form accuracy of such groove can be observed, means for supporting a magnifying glass over the roller, a pair of screw thread engaging anvils on the base adapted to engage the screw threaded element at the side opposite to that engaged by the said roller, one of the anvils being normally fixed against movement in a direction parallel to the axis of the screw threaded element and the other anvil being a freely rotatable roller, means mounting the roller for movement in such direction, and means cooperating with and accurately indicating the axial movement of the movable anvil.

13. In a screw thread testing device, the combination of a base, a pair of spaced freely rotatable rollers thereon each having an annular thread-engaging periphery adapted to engage one side of a threaded element to be tested, the said peripheries being shaped to fit the groove of the thread being tested whereby the form accuracy of such groove can be observed, means for engaging the threads of the screw threaded element at the side opposite to that engaged by the rollers and cooperating with the rollers to support a threaded piece to be gaged, an indicator, and means including an operative connection between the last said means and the indicator whereby inaccuracy of the pitch of the thread measured axially of the threaded piece being tested is denoted by the indicator.

14. In a screw thread testing device, the combination of a base, screw thread engaging means thereon adapted to engage one side of a threaded element to be tested, the thread-engaging portion of such means being shaped to fit the groove of the thread being tested whereby the form accuracy of such groove can be observed, means for supporting a magnifying glass over the thread-engaging means, a pair of co-axial annular thread-engaging members on the base adapted to engage the screw threaded element at the side opposite that engaged by the said means, an indicator, one of the members being normally fixed against axial movement, means mounting the other member for movement axially, and means cooperating with the indicator and movable member for operating the former upon axial movement of the latter.

15. A screw holding cradle comprising the combination of a shaft, a roller thereon, a member spaced from and cooperating with the roller, the periphery of the roller being V-shaped in cross section to engage a screw between adjacent threads thereof and the said member having a like peripheral portion cooperating therewith to engage the screw, means holding the member against movement axially of the shaft to provide a fixed point in the lead of the thread of the screw, the roller being movable axially responsive to lead error in such screw, and means located in opposed relation to the roller and member in a manner cooperating therewith to support the screw.

16. A screw holding cradle comprising the combination of a pair of coaxial and relatively spaced annular members, the peripheries of the members being V-shaped in cross section to engage a screw between adjacent threads thereof, means holding one of the members against movement axially to provide a fixed point in the lead of the thread of the screw, the other member being movable axially responsive to lead error in such screw, and means located in opposed relation to the members in a manner cooperating therewith to support the screw.

17. A screw holding cradle comprising the combination of a pair of coaxial and relatively spaced annular members, means holding one of the members against movement axially to provide a fixed point in the lead of the thread of the screw being tested, the periphery of such members being V-shaped in cross section and of an angle corresponding to the angle formed by the angle faces of the threads to be tested whereby to accurately engage such faces, the other member being movable axially responsive to lead error in the screw, and means located in opposed relation to the members in a manner cooperating therewith to support the screw.

18. A screw holding cradle comprising the combination of a pair of coaxial and relatively spaced annular members, the peripheries of the members being V-shaped in cross section to correspond to the angle formed by the angle faces of the thread of the screw to be tested in a manner to engage between adjacent threads of such screw and the crests of such peripheries being truncated whereby the bearing thereof will be wholly on the opposing faces of the threads with clearance at the root, means holding one of the members against movement axially, the other member being movable axially, and means located in opposed relation to the members in a manner cooperating therewith to support the screw.

19. A screw holding cradle comprising the combination of a pair of coaxial and relatively spaced annular members, the peripheries of the members being V-shaped in cross section to engage a screw between adjacent threads thereof, means holding one of the members against movement axially, the other member being movable axially, and a pair of rollers located in opposed relation to the members in a manner cooperating therewith to support the screw.

20. In a screw thread comparator, a screw holding cradle comprising the combination of a shaft, a roller thereon, a member spaced from and cooperating with the roller, the periphery of the roller being accurately formed to the shape of the correct groove in the screw thread to be tested and the said member having a V-shaped peripheral portion cooperating therewith to engage a screw between adjacent threads thereof, the roller and member being so mounted as to be relatively movable axially of the shaft, and means located in opposed relation to the roller and member in a manner cooperating therewith to support the screw.

21. In a screw thread comparator, a screw holding cradle comprising the combination of a pair of coaxial and relatively spaced annular members, the peripheries of the members being V-shaped in cross section to engage a screw thread between adjacent threads thereof and one of such peripheries being accurately formed to the shape of the correct groove in the screw thread to be tested, the members being so mounted as to be relatively movable axially, and means located in opposed relation to the members in a manner cooperating therewith to support the screw.

CHARLES G. JOHNSON.